US010726959B2

(12) United States Patent
Katono et al.

(10) Patent No.: US 10,726,959 B2
(45) Date of Patent: Jul. 28, 2020

(54) NUCLEAR POWER PLANT

(71) Applicant: Hitachi-GE Nuclear Energy, Ltd., Hitachi-shi, Ibaraki (JP)

(72) Inventors: Kenichi Katono, Hitachi (JP); Masao Chaki, Hitachi (JP); Kazuaki Kito, Mito (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 838 days.

(21) Appl. No.: 15/099,398

(22) Filed: Apr. 14, 2016

(65) Prior Publication Data
US 2016/0293281 A1 Oct. 6, 2016

Related U.S. Application Data

(62) Division of application No. 13/768,600, filed on Feb. 15, 2013, now abandoned.

(30) Foreign Application Priority Data

Feb. 23, 2012 (JP) ................................ 2012-037424

(51) Int. Cl.
*G21C 15/18* (2006.01)
*G21C 9/012* (2006.01)
*G21C 13/02* (2006.01)

(52) U.S. Cl.
CPC ............. *G21C 15/18* (2013.01); *G21C 9/012* (2013.01); *G21C 13/02* (2013.01); *Y02E 30/40* (2013.01)

(58) Field of Classification Search
CPC ...... G21C 15/18; G21C 13/022; G21C 9/004; G21C 9/012
See application file for complete search history.

(56) References Cited

U.S. PATENT DOCUMENTS 4,057,465 A 11/1977 Thompson et al.
4,948,554 A * 8/1990 Gou ....................... G21C 9/012
376/283

(Continued)

FOREIGN PATENT DOCUMENTS

JP 52-21596 A 2/1977
JP 62-182697 A 8/1987

(Continued)

OTHER PUBLICATIONS

Japanese Office Action issued in counterpart Japanese Application No. JP 2012-037424 dated Jun. 23, 2015, with English translation (Nine (9) pages).

*Primary Examiner* — Sharon M Davis
(74) *Attorney, Agent, or Firm* — Crowell & Moring LLP

(57) ABSTRACT

When a power source is lost after an operation stop of a nuclear power plant, a first open/close valve is opened via a first battery at an early stage and steam in a reactor pressure vessel (RPV) is condensed in a suppression pool. The heat of the water in the suppression pool is transmitted to a cooling water pool located below inner space between first and second reactor containment vessels surrounding the RPV. A second open/close valve is opened via a second battery at the early stage and cooling water in a tank is injected into the RPV. After the early stage, a third open/close valve is opened via a third battery, and a cooling medium becomes steam by an evaporator in the RPV, the steam being condensed by a condenser disposed in the inner space to become a liquid of the cooling medium and is returned to the evaporator.

7 Claims, 3 Drawing Sheets

(56) References Cited

U.S. PATENT DOCUMENTS

| | | | |
|---|---|---|---|
| 4,950,448 A | 8/1990 | Gou et al. | |
| 5,006,303 A * | 4/1991 | Rowlands | G21C 15/18 376/281 |
| 5,011,652 A * | 4/1991 | Tominaga | G21C 15/18 376/282 |
| 5,059,385 A | 10/1991 | Gluntz et al. | |
| 5,076,999 A | 12/1991 | Forsberg | |
| 5,091,143 A * | 2/1992 | Tate | G21C 1/084 376/282 |
| 5,169,596 A * | 12/1992 | Orr | G21C 13/00 376/293 |
| 5,211,906 A * | 5/1993 | Hatamiya | G21C 13/00 376/283 |
| 5,272,737 A * | 12/1993 | Fujii | G21C 15/18 376/283 |
| 5,295,169 A | 3/1994 | Tominaga et al. | |
| 5,349,616 A | 9/1994 | Nakayama et al. | |
| 5,426,681 A | 6/1995 | Aburomia | |
| 5,684,848 A | 11/1997 | Gou et al. | |
| 2012/0121056 A1 | 5/2012 | Sato et al. | |
| 2012/0281802 A1 | 11/2012 | Niida | |

FOREIGN PATENT DOCUMENTS

| | | | |
|---|---|---|---|
| JP | 2-253195 A | 10/1990 | |
| JP | 2-253196 A | 10/1990 | |
| JP | 5-172979 A | 7/1993 | |
| JP | 10-39065 A | 2/1998 | |
| JP | 2006-138744 A | 6/2006 | |
| JP | 2011-58866 A | 3/2011 | |
| JP | 2011-196801 A | 10/2011 | |

\* cited by examiner

NUCLEAR POWER PLANT

CLAIM OF PRIORITY

This application is a divisional of U.S. application Ser. No. 13/768,600, filed Feb. 15, 2013, which claims priority from Japanese Patent application serial no. 2012-037424, filed on Feb. 23, 2012, the disclosures of which are expressly incorporated by reference herein.

BACKGROUND OF THE INVENTION

[Technical Field]

The present invention relates to a nuclear power plant and more particularly to a nuclear power plant applicable to a boiling water nuclear power plant having comparatively low thermal power.

[Background Art]

In the nuclear power plant (for example, the boiling water nuclear power plant), even after the operation stop, it is necessary to supply cooling water to a core in a reactor pressure vessel and cool a plurality of fuel assemblies loaded in the core to remove decay heat generated in a nuclear fuel material included in the fuel assemblies. Generally, after the operation stop of the nuclear power plant, a part of the cooling water in the reactor pressure vessel is discharged into a pipe connected to the reactor pressure vessel, and the discharged cooling water is cooled by heat-exchanging it with seawater in a heat exchanger connected to the pipe, and is returned to the reactor pressure vessel through a return pipe of the cooling water that is cooled. As mentioned above, after the operation stop of the nuclear power plant, the cooling water in the reactor pressure vessel is heat-exchanged with seawater, thus the decay heat of the nuclear fuel material is removed.

Such a nuclear power plant uses a motor-driven pump to supply the cooling water in the reactor pressure vessel to the heat exchanger and supply seawater to the heat exchanger, and electricity for driving the motor-driven pump is necessary to remove the decay heat after the stop of the nuclear power plant. When an abnormal event of external power loss occurs at the time of stop of the nuclear power plant, an emergency generator is driven, and the motor-driven pump is driven, and the decay heat when the nuclear power plant is not in operation is removed.

A reactor cooling system where, when a loss-of-coolant accident occurs, the safety of the core can be ensured by forces of nature without using a dynamic device and both removal of the decay heat in the reactor and a water injection function are achieved by a same facility, is proposed in Japanese Patent Laid-Open No. 62(1987)-182697. In this reactor cooling system, a tank including a body filled with water disposed at a higher position than the reactor pressure vessel and a pipe passing through longitudinally in the body is disposed at a higher position than the reactor pressure vessel. At the time of a loss-of-coolant accident, the steam in the reactor pressure vessel is discharged and condensed in the water in the body and the water in the body is injected into the reactor pressure vessel. At the time of an anticipated operational occurrence that a main condenser cannot be used due to a turbine trip, the steam in the reactor pressure vessel is introduced into the pipe and is cooled by the water in the body, and the steam is condensed in the pipe by this cooling and the generated condensed water is injected into the reactor pressure vessel. In the reactor cooling system described in Japanese Patent Laid-Open No. 62(1987)-182697, it is possible to cool the steam in the reactor pressure vessel and inject the condensed water into the reactor pressure vessel by gravity both in a loss-of-coolant accident and at an anticipated operational occurrence.

Japanese Patent Laid-open No. 2011-58866 describes a nuclear power plant having a reactor isolation condenser for cooling the fuel assemblies in the core when a station blackout occurs and the reactor enters an isolation state, and a gravity-driven cooling system. The reactor isolation condenser is provided with a condenser pool disposed above the reactor pressure vessel for storing cooling water, a condenser heat exchanger installed in the cooling water in the condenser pool, a steam supply pipe connected into a steam space in the reactor pressure vessel and connected to the condenser heat exchanger, and a condensed-water return pipe connected to the condenser heat exchanger, and the reactor pressure vessel. The gravity-driven cooling system is provided with a gravity-driven cooling system pool which is disposed above the core in the reactor pressure vessel and is filled with cooling water, and an injection pipe for connecting the gravity-driven cooling system pool and the reactor pressure vessel.

When a station blackout occurred and the reactor entered an isolation state, the steam in the reactor pressure vessel is introduced to the condenser heat exchanger through the steam supply pipe and is condensed by the cooling water in the condenser pool. The condensed water generated by the condensation is returned to the reactor pressure vessel through the condensed-water return pipe. The cooling of the core in the reactor pressure vessel is enabled by the reactor isolation condenser even if a station blackout occurs and the reactor enters an isolation state. Further, when a loss-of-coolant accident occurs, the cooling water in the gravity-driven cooling system pool is supply to the core through the injection pipe.

CITATION LIST

Patent Literature

[Patent Literature 1] Japanese Patent Laid-Open No. 62(1987)-182697

[Patent Literature 2] Japanese Patent Laid-open No. 2011-58866

SUMMARY OF THE INVENTION

Technical Problem

In the reactor isolation condenser and the gravity falling reactor cooling system which are described in Japanese Patent Laid-Open No. 2011-58866, even when a station blackout occurs, the cooling of the core in the reactor pressure vessel is enabled. The reactor cooling system described in Japanese Patent Laid-Open No. 62(1987)-182697 can inject condensed water into the reactor pressure vessel by gravity and if a valve installed on each pipe for connecting the reactor pressure vessel and tank is structured so as to open and close by a battery, the cooling of the core in the reactor pressure vessel is enabled even if a station blackout occurs.

However, an isolation condenser described in Japanese Patent Laid-Open No. 62(1987)-182697, as described above, can perform non-power operation, though the cooling water quantity filled in the pool is limited, so that to continuously cool the core in the reactor pressure vessel for a long period of time, cooling water needs to be supplied from the outside of the nuclear power plant.

An object of the present invention is to provide a nuclear power plant capable of cooling a core over a longer period of time without supplying cooling water from outside of a nuclear power plant.

Solution to Problem

A feature of the present invention for accomplishing the above object is a nuclear power plant comprising a first reactor containment vessel internally having a dry well and a pressure suppression chamber mutually isolated, the pressure suppression chamber forming a suppression pool being filled with cooling water; a reactor pressure vessel disposed in the dry well in the first reactor containment vessel; a second reactor containment vessel surrounding the first reactor containment vessel and forming a cooling water pool being filled with cooling water at a bottom, the cooling water pool in the second reactor containment vessel adjoining the suppression pool with the first reactor containment vessel intervening between these pools; a steam discharge apparatus; and a reactor cooling apparatus, wherein the steam discharge apparatus has a steam discharge pipe connected to the reactor pressure vessel and immersed in the cooling water in the suppression pool, and a first open/close valve installed in the steam discharge pipe; and the reactor cooling apparatus has an evaporator installed in the reactor pressure vessel for evaporating a cooling medium, a condenser disposed above the cooling water pool between the first reactor containment vessel and the second reactor containment vessel for condensing steam of the cooling medium generated by the evaporator, a first pipe path connected to the evaporator and the condenser by passing through a side wall of the reactor pressure vessel and a side wall of the first reactor containment vessel, the first pipe path introducing the steam of the cooling medium generated in the evaporator, a second pipe path connected to the condenser and the evaporator by passing through the side wall of the reactor pressure vessel and the side wall of the first reactor containment vessel, the second pipe path introducing a liquid of the cooling medium generated in the condenser to the evaporator, and a second open/close valve installed in either the first pipe path or the second pipe path.

It is preferable that the nuclear power plant is provided with a water injection apparatus having a cooling water vessel being filled with cooling water, a cooling water injection pipe connected to the cooling water vessel and the reactor pressure vessel, and an injection valve installed on the cooling water injection pipe.

Advantageous Effect of the Invention

According to the present invention, the cooling of the core can be executed over a longer period of time without supplying cooling water from the outside of the nuclear power plant.

DETAILED DESCRIPTION OF THE PREFERRED EMBODIMENTS

Figure 2:
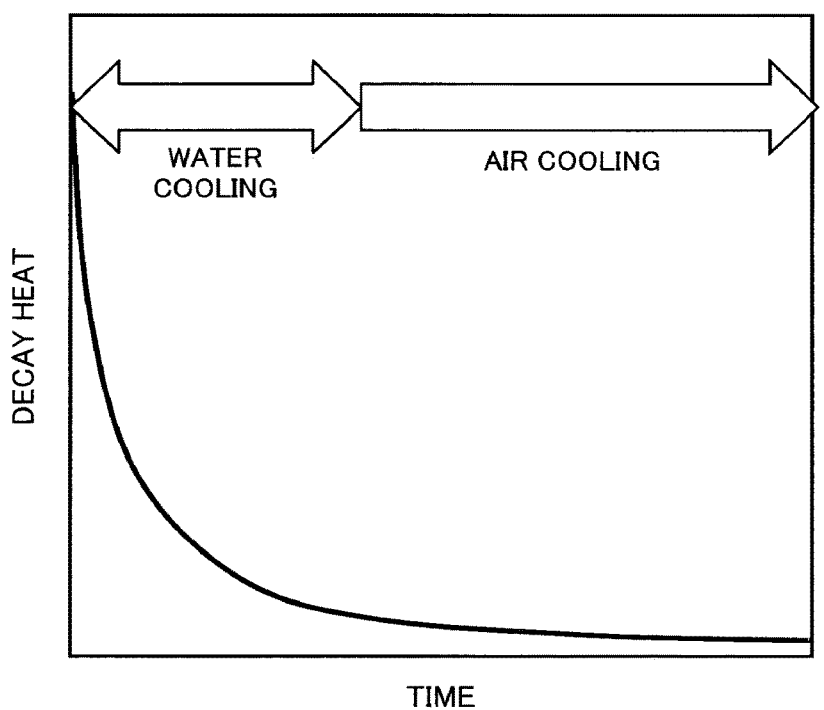
FIG. 2 is an explanatory drawing showing a change with time of decay heat generated in a core in a reactor pressure vessel after stop of a nuclear power plant.

The decay heat generated by a nuclear fuel material included in a fuel assembly loaded in the core in the reactor pressure vessel after stop of a nuclear power plant becomes initially large due to a short-half-life radionuclide included in the nuclear fuel material as shown in FIG. 2, and is slowly reduced in process of time because the short-half-life radionuclide is reduced in process of time from the stop time of the nuclear power plant. Based on this result, the inventors concluded that it is desirable to remove the initial decay heat after the stop of the nuclear power plant using water having latent heat due to phase change and a high heat capacity and, in the long run, construct a hybrid type reactor cooling system for removing the heat continuously by air.

This will ensure that, when the power of the nuclear power plant is lost, the reactor can be cooled continuously over a long period of time without support from the outside of the nuclear power plant such as supply of cooling water.

The embodiments of the present invention reflecting the aforementioned study results will be explained below.

[Embodiment 1]

Figure 1:
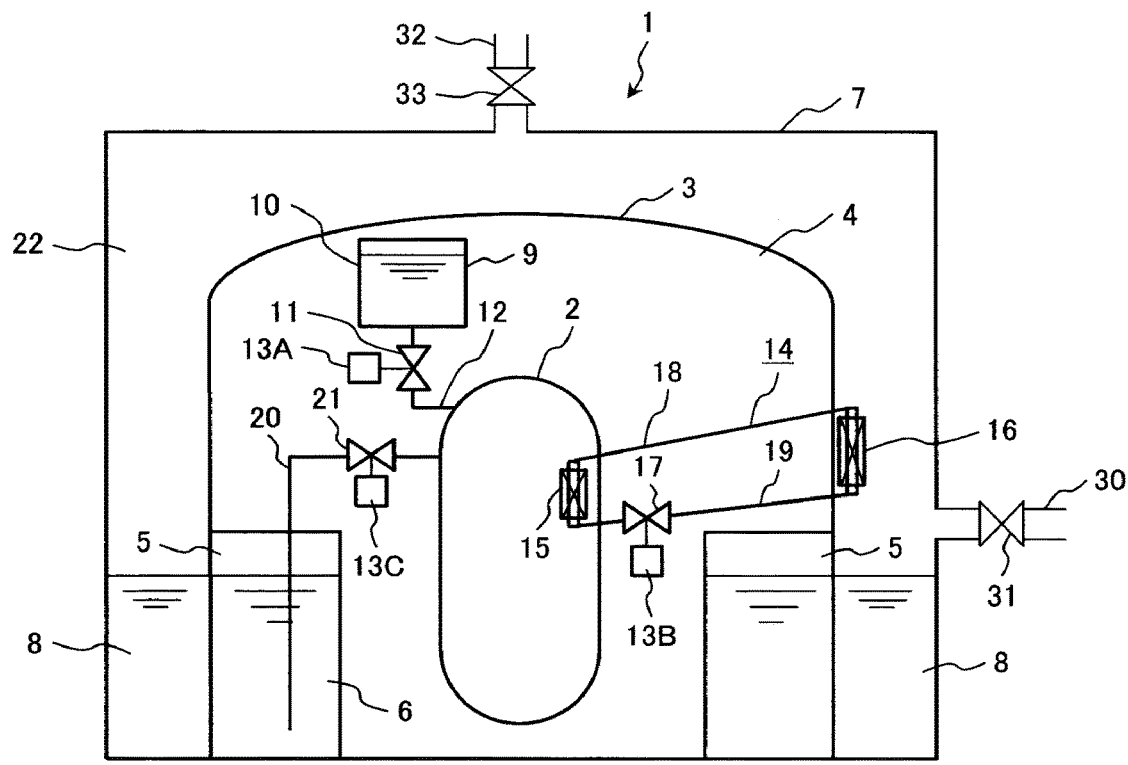
FIG. 1 is a structural diagram showing a nuclear power plant according to embodiment 1 which is a preferred embodiment of the present invention.

A nuclear power plant which is a preferred embodiment of the present invention will be explained by referring to FIG. 1.

A nuclear power plant 1 of the present embodiment is a boiling water nuclear power plant and is provided with a reactor pressure vessel 2 having a core (not shown) disposed in the reactor pressure vessel 2 and loaded with a plurality of fuel assemblies (not shown), a reactor containment vessel 3 (hereinafter referred to as a first reactor containment vessel) made of steel, a water injection apparatus 9, and a reactor cooling apparatus 14. The reactor pressure vessel 2 is disposed in a dry well 4 of the reactor containment vessel 3. The reactor containment vessel 3 includes the dry well 4 and a pressure suppression chamber 5 isolated from the dry well 4. In the pressure suppression chamber 5, a suppression pool 6 filled with cooling water is formed. An opening formed at a lower end portion of a vent path (not shown) with an upper end portion communicated with the dry well 4 is immersed in cooling water of the suppression pool 6. A steam discharge pipe 20 connected to the reactor pressure vessel 2 and having an open/close valve 21 reaches inside the pressure suppression chamber 5. An opening formed at a lower end portion of the steam discharge pipe 20 is immersed in the cooling water of the suppression pool 6. The steam discharge pipe 20 having an open/close valve 21 structures a steam discharge apparatus. The open/close valve 21 is opened or closed by supply of electricity from a normal power source (or an outside power source and an emergency power source). In preparation for loss of these power sources, the open/close valve 21 is connected to a battery 13C with a wire via a first switch (not shown).

The reactor containment vessel 3 is installed in a reactor containment vessel (or a reactor building) 7 (hereinafter referred to as a second reactor containment vessel). In the second reactor containment vessel 7 and on a bottom thereof, a cooling water pool 8 filled with cooling water is formed. The cooling water pool 8 adjoins the suppression pool 6 with the first reactor containment vessel 3 intervening therebetween. An air supply pipe 30 provided with an open/close valve 31 is installed on a side wall of the second reactor containment vessel 7 above a liquid surface of the cooling water pool 8 and below a condenser 16. A plurality of air supply pipes 30 provided with the open/close valve 31 as necessary are attached to the side wall of the second reactor containment vessel 7 at intervals in the circumferential direction of the second reactor containment vessel 7. An air discharge pipe 32 provided with an open/close valve 33 is attached to a ceiling of the second reactor containment vessel 7.

The water injection apparatus 9 has a water tank 10 filled with cooling water, an injection valve 11, and an injection pipe 12. The injection pipe 12 provided with the injection valve 11 connects the water tank 10 and the reactor pressure vessel 2. The injection valve 11 is opened or closed by supply of the electricity from the normal power source (or the outside power source and the emergency power source). In preparation for loss of these power sources, the injection valve 11 is connected to a battery 13A with a wire via a second switch (not shown).

The reactor cooling apparatus 14 has an evaporator 15 including heat exchanger tubes, the condenser 16 including heat exchanger tubes, a steam pipe (a first pipe path) 18, and a liquid pipe (a second pipe path) 19. The evaporator 15 and the condenser 16 are a kind of heat exchanger. In the nuclear power plant 1 shown in FIG. 1, a plurality of reactor cooling apparatuses 14 are installed, though only one of them is shown. The evaporator 15 is disposed in the reactor pressure vessel 2 and the condenser 16 is disposed in an inner space 22 in the second reactor containment vessel 7 outside the first reactor containment vessel 3. The inner space 22 is formed between the first reactor containment vessel 3 and the second reactor containment vessel 7. The steam pipe 18 connects each outlet of the heat exchanger tubes of the evaporator 15 and each inlet of the heat exchanger tubes of the condenser 16 and the liquid pipe 19 connects each outlet of the heat exchanger tubes of the condenser 16 and each inlet of the heat exchanger tubes of the evaporator 15. The condenser 16 is disposed at a higher position than the evaporator 15. Therefore, the steam pipe 18 and the liquid pipe 19 penetrating the reactor pressure vessel 2 and the first reactor containment vessel 3 are disposed at a slope from the condenser 16 toward the evaporator 15. An open/close valve 17 is installed on the liquid pipe 19. The open/close valve 17 is opened or closed by supply of the electricity from the normal power source (or the outside power source and the emergency power source). In preparation for loss of these power sources, the open/close valve 17 is connected to a battery 13B with a wire via a third switch (not shown). The open/close valve 17 may be installed on the steam pipe 18 instead of the liquid pipe 19.

Consider a situation in which the operation of the nuclear power plant 1 is stopped and the normal power source, the outside power source, and the emergency power source are lost. At this time, an operator closes the first switch, thus electricity is supplied from the battery 13C to the open/close valve 21, and the open/close valve 21 is opened. The steam in the reactor pressure vessel 2 is discharged in the cooling water in the suppression pool 6 through the steam discharge pipe 20 and condensed by the cooling water. The steam in the reactor pressure vessel 2 is discharged into the suppression pool 6, so that the pressure in the reactor pressure vessel 2 drops. At an early stage after the stop of the nuclear power plant, the steam in the reactor pressure vessel 2 is discharged into the suppression pool 6 and is condensed by the cooling water, thus the decay heat generated in each fuel assembly loaded in the core in the reactor pressure vessel 2 can be removed by sensible heat and latent heat of the cooling water in the suppression pool 6 at an early stage after the stop of the nuclear power plant. The temperature of the cooling water in the suppression pool 6 rises due to the condensation of the steam. However, the quantity of heat possessed by the cooling water in the suppression pool 6 is transmitted to the cooling water in the cooling water pool 8 via the side wall of the first reactor containment vessel 3 made of steel. Therefore, the decay heat generated from each fuel assembly can be removed by the sensible heat and latent heat of the cooling water in the cooling water pool 8.

The operator closes the second switch simultaneously with opening of the open/close valve 21 (or after the pressure in the reactor pressure vessel 2 drops due to discharge of steam into the suppression pool 6), thus the electricity is supplied from the battery 13A to the injection valve 11 and the injection valve 11 is opened. The cooling water in the water tank 10 is injected into the reactor pressure vessel 2 by gravity falling through the injection pipe 12. Each fuel assembly loaded in the core in the reactor pressure vessel 2 is cooled by the cooling water injected by the injection pipe 12. The cooling water quantity in the reactor pressure vessel 2 can be reserved by injection of cooling water from the water tank 10 and the submergence of the core can be maintained.

When the predetermined time elapses after the stop of the nuclear power plant, the operator closes the third switch, thus the electricity is supplied from the battery 13B to the open/close valve 17, and the open/close valve 17 is opened. Furthermore, the operator opens the first switch, and the open/close valve 21 is closed totally due to stop of the electricity from the battery 13C. The heat exchanger tubes of evaporator 15, the heat exchanger tubes of the condenser 16, the steam pipe 18, and the liquid pipe 19 are filled with a cooling medium (for example, water). In the heat exchanger tubes of the evaporator 15, the cooling medium is heated by high-temperature cooling water (or steam) in the reactor pressure vessel 2 and evaporated to become steam. The steam of the cooling medium ascends in the steam pipe 18 and reaches the heat exchanger tubes of the condenser 16. The steam of the cooling medium in the heat exchanger tubes of the condenser 16 is cooled by the air in the inner space 22 existing above the cooling water pool 8 between the first reactor containment vessel 3 and the second reactor containment vessel 7 and become a liquid of the cooling medium. The liquid of the cooling medium descends in the liquid pipe 19 and flows into the heat exchanger tubes of the evaporator 15. In the heat exchanger tubes of the evaporator 15, as described above, the cooling medium of the liquid is heated to become steam by high-temperature cooling water (or steam) in the reactor pressure vessel 2. And, the steam of the cooling medium is condensed in the heat exchanger tubes of the condenser 16.

The cooling medium is circulated through the heat exchanger tubes of the evaporator 15, the steam pipe 18, the heat exchanger tubes of the condenser 16, the liquid pipe 19, and the heat exchanger tubes of the evaporator 15, transmits the heat of the cooling water in the reactor pressure vessel 2 to the air in the inner space 22, and cools the cooling water in the reactor pressure vessel 2. Namely, as described above, the cooling medium cools the cooling water in the reactor pressure vessel 2 by circulating between the evaporator 15 and the condenser 16 and the decay heat generated by the fuel assemblies in the core is discharged into the inner space 22 by the reactor cooling apparatus 14.

In the state where the operation of the nuclear power plant 1 is stopped and the normal power source, the outside power source, and the emergency power source are lost, the open/close valves 31 and 33 are opened by the electricity supplied from the batteries (not shown). By doing this, the inner space 22 and an outside of the second reactor containment vessel 7 are connected by an air supply pipe 30 and an air discharge pipe 32. Therefore, air existing in an outside region of the second reactor containment vessel 7 is supplied to the inner space 22 from the air supply pipe 30. The air in the inner space 22 is heated by the heat discharged from the condenser 16, ascends in the inner space 22, and is discharged the outside region of the second reactor containment vessel 7 through the air discharge pipe 32. Therefore, the cooling medium in the reactor cooling apparatus 14 is circulated between the reactor pressure vessel 2 and the inner space 22, thus the decay heat generated in the fuel assemblies in the core can be discharged continuously outside the second reactor containment vessel 7. Further, the open/close valves 31 and 33 are totally closed at the time of normal operation of the nuclear power plant 1.

In the present embodiment, at an early stage after the stop of the nuclear power plant in the state where the normal power source, the outside power source, and the emergency power source are lost, the steam in the reactor pressure vessel 2 is discharged into the cooling water of the suppression pool 6 through the steam discharge pipe 20, so that the steam generated by the decay heat of the nuclear fuel material in the fuel assembly can be removed by the cooling water in the suppression pool 6. Therefore, the aforementioned decay heat generated at an early stage after the stop of the nuclear power plant can be removed by water cooling of the cooling water of the suppression pool 6. If the temperature of the cooling water of the suppression pool 6 rises, the cooling water of the suppression pool 6 is cooled by the cooling water of the cooling water pool 8. This results in that the decay heat is cooled by the cooling water of the cooling water pool 8.

The injection valve 11 is opened simultaneously with opening of the open/close valve 21 or after the pressure in the reactor pressure vessel 2 drops due to discharge of steam, so that at an early stage after the stop of the nuclear power plant, the cooling water in the water tank 10 can be injected into the reactor pressure vessel 2 by gravity falling. By doing this, the core loading a plurality of fuel assemblies can be submerged in the cooling water and these fuel assemblies can be cooled by the cooling water.

As shown in FIG. 2, when a certain period elapses from the time of stop of the nuclear power plant, the generation quantity of the decay heat generated by the nuclear fuel material included in the fuel assemblies in the core is reduced. At this time, the decay heat can be removed by air cooling, not by water cooling. The reactor cooling apparatus 14 using a cooling medium is used to remove the decay heat by air cooling. In the evaporator 15, the cooling medium is heated by high-temperature cooling water (or steam) in the reactor pressure vessel 2 and is evaporated to become steam and in the condenser 16, the steam of the cooling medium is cooled by the air in the inner space 22 to become a liquid of the cooling medium. This way, since the cooling medium is circulated between the evaporator 15 and the condenser 16, the decay heat generated by the nuclear fuel material in the core can be removed over a long period of time.

In the present embodiment, as described above, the decay heat is removed by the water cooling using the steam discharge apparatus and the water injection apparatus 9 at an early stage where the heat quantity of the decay heat is large and furthermore, the decay heat is removed by the air cooling by the reactor cooling apparatus 14 at the subsequent stage where the heat quantity of the decay heat is reduced. Therefore, the cooling of the core in the reactor pressure vessel 2 can be executed continuously over a longer period of time without supplying cooling water from the outside of the nuclear power plant.

Furthermore, the present embodiment uses the batteries 13A, 13B, and 13C, so that even when the operation of the nuclear power plant 1 is stopped and the normal power source, the outside power source, and the emergency power source are lost, the injection valve 11 and the open/close valves 17 and 21 can be opened by the batteries 13A, 13B, and 13C and as described above, the cooling of the core in the reactor pressure vessel 2 can be executed continuously over a longer period of time.

Further, after the stop of the nuclear power plant, when the electricity is supplied from any power source among the normal power source, the outside power source, and the emergency power source, the injection valve 11 and the open/close valves 13B and 13C are opened by this electricity and the aforementioned cooling is executed.

[Embodiment 2]

Figure 3:
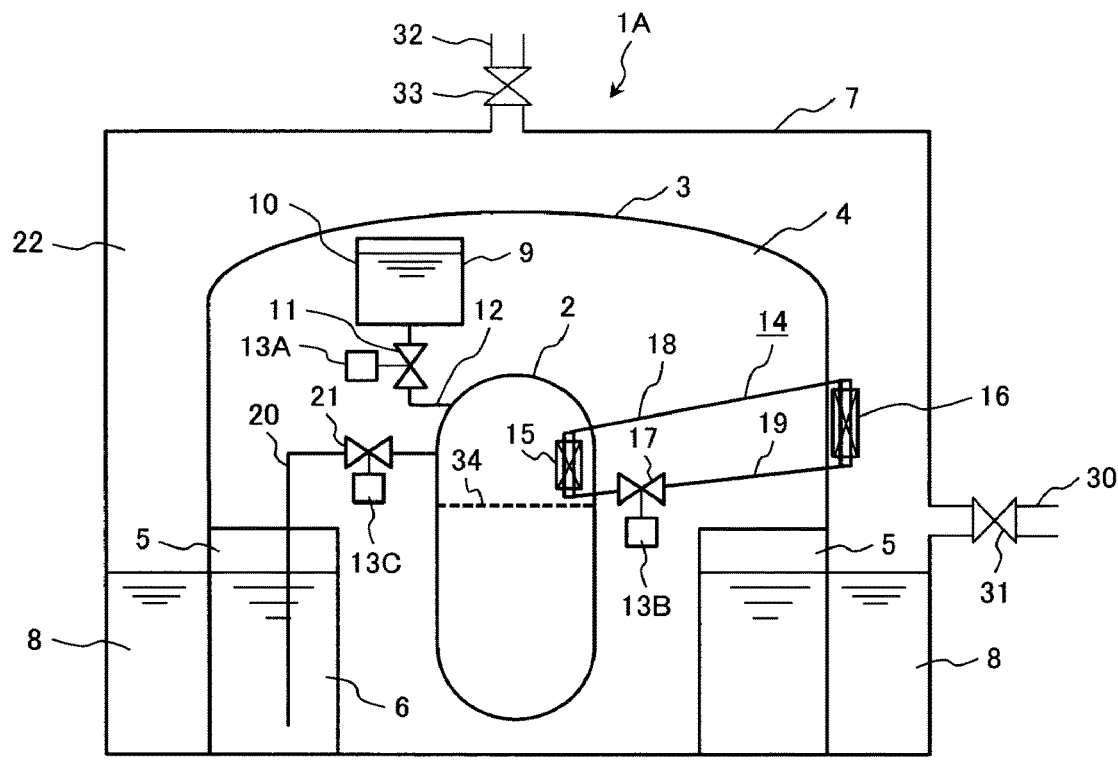
FIG. 3 is a structural diagram showing a nuclear power plant according to embodiment 2 which is another preferred embodiment of the present invention.

A nuclear power plant according to embodiment 2 which is another preferred embodiment of the present invention will be explained by referring to FIG. 3.

A nuclear power plant 1A of the present embodiment has a structure that in the nuclear power plant 1 of embodiment 1, the evaporator 15 is disposed above a water surface 34 forming water level (NWL) at the time of normal operation in the reactor pressure vessel 2. The other structures of the nuclear power plant 1A are the same as those of the nuclear power plant 1 of embodiment 1. The nuclear power plant 1A of the present embodiment is a boiling water nuclear power plant.

The present embodiment can obtain each effect generated in embodiment 1. Furthermore, according to the present embodiment, the evaporator 15 is disposed in steam space having high dryness in the reactor pressure vessel 2 and compared with the case that it is disposed in cooling water, the heat transfer property to the reactor cooling apparatus 14 is excellent, so that the area required for the transfer can be reduced and the evaporator 15 can be made compact.

[Embodiment 3]

Figure 4:
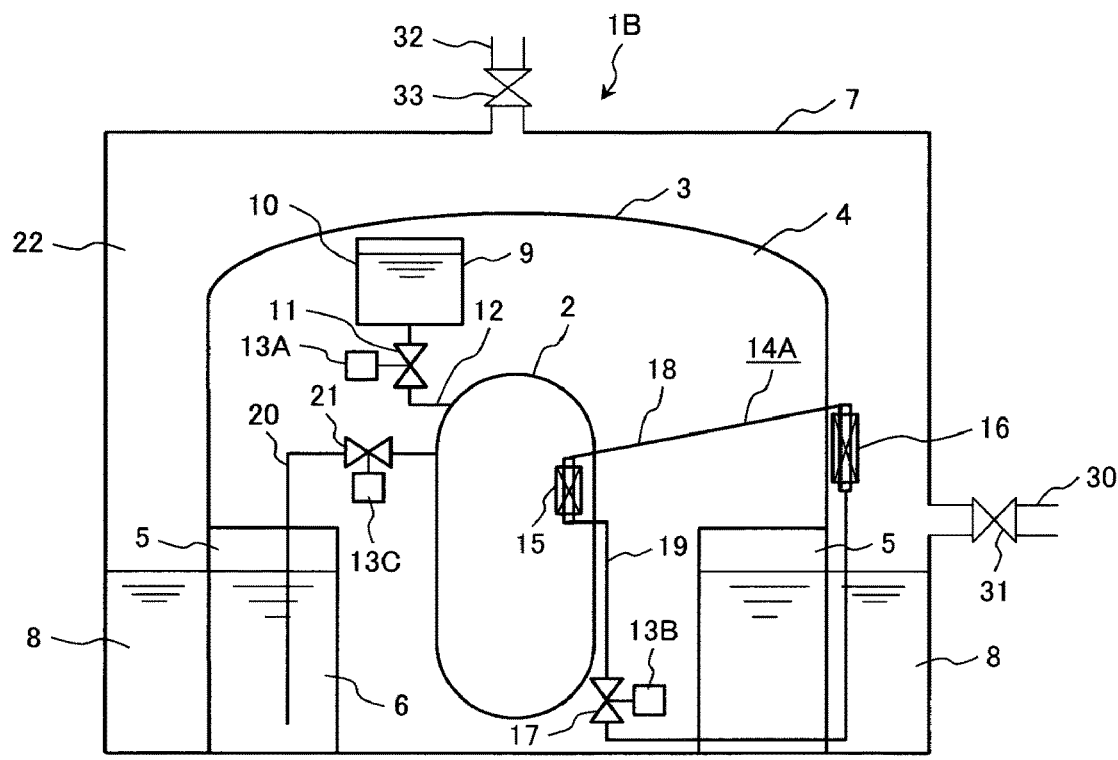
FIG. 4 is a structural diagram showing a nuclear power plant according to embodiment 3 which is other preferred embodiment of the present invention.

A nuclear power plant according to embodiment 3 which is other preferred embodiment of the present invention will be explained by referring to FIG. 4.

A nuclear power plant 1B of the present embodiment is a boiling water nuclear power plant and has a structure that in the nuclear power plant 1 of embodiment 1, the liquid pipe 19 of the reactor cooling apparatus 14 is disposed in the cooling water pool 8 and the suppression pool 6. The other structures of the nuclear power plant 1B are the same as those of the nuclear power plant 1 of embodiment 1.

In the present embodiment, the liquid pipe 19 connected to each outlet of the heat exchanger tubes of the condenser 16 disposed in the inner space 22 is disposed in the inner space 22 outside the first reactor containment vessel 3, is extended toward the bottom of the second reactor containment vessel 7, is disposed in the cooling water pool 8, is extended in the cooling water of the cooling water pool 8 along the bottom, and is disposed in the cooling water of the suppression pool 6. The liquid pipe 19 is further extended in the cooling water of the suppression pool 6 toward the dry well 4 along the bottom of the suppression pool 6, is extended upward in the dry well 4, and is connected to each inlet of the heat exchanger tubes of the evaporator 15 in the reactor pressure vessel 2.

The present embodiment can obtain each effect generated in embodiment 1. In the present embodiment, the liquid pipe 19 is disposed in the cooling water of each of the cooling water pool 8 and the suppression pool 6, so that the liquid of the cooling medium can be cooled by each of the cooling water pool 8 and the suppression pool 6 and the temperature of the liquid of the cooling medium can be further reduced. If the temperature of the liquid of the cooling medium flowing in the liquid pipe 19 falls, the flow rate of the steam of the cooling medium generated by the evaporator 15 is reduced and the steam flow velocity in the steam pipe 18 is reduced. The frictional loss in the liquid pipe 19 is increased, though in the pressure loss of the entire reactor cooling apparatus 14, the frictional loss in the steam pipe 18 is dominant. Therefore, the reduction in the steam flow velocity in the steam pipe 18 makes the pressure loss of the entire reactor cooling apparatus 14 smaller and improves the heat transport limit in the reactor cooling apparatus 14.

[Embodiment 4]

Figure 5:
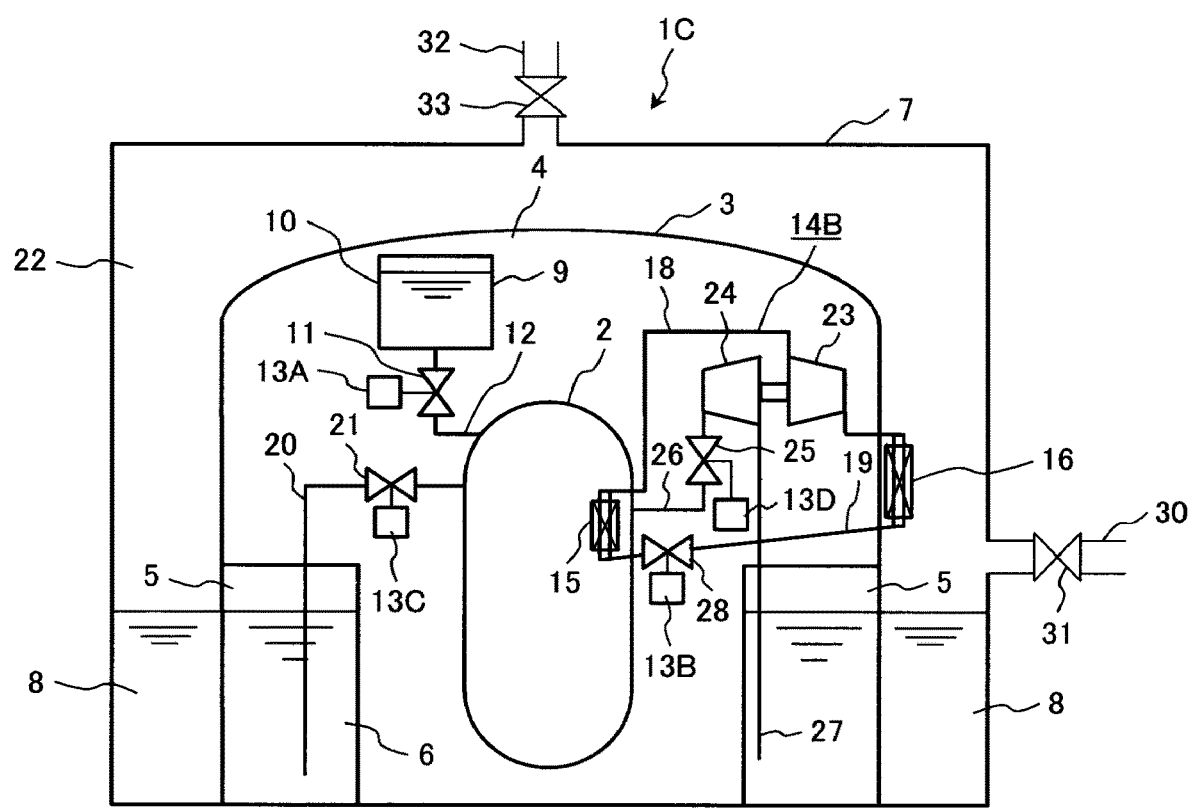
FIG. 5 is a structural diagram showing a nuclear power plant according to embodiment 4 which is other preferred embodiment of the present invention.

A nuclear power plant according to embodiment 4 which is other preferred embodiment of the present invention will be explained by referring to FIG. 5.

A nuclear power plant 1C of the present embodiment is a boiling water nuclear power plant and has a structure that a compressor 23 and a turbo-motor 24 are added to the nuclear power plant 1 of embodiment 1. The other structures of the nuclear power plant 1C are the same as those of the nuclear power plant 1 of embodiment 1.

The compressor 23 coupled to the turbo-motor 24 is installed on the steam pipe 18. A steam pipe 26 provided with an open/close valve 25 is connected to a steam inlet of the turbo-motor 24. A steam discharge pipe 27 connected to a steam outlet of the turbo-motor 24 is extended into the cooling water of the suppression pool 6. The open/close valve 25 is opened or closed by supply of the electricity from the normal power source (or the outside power source and emergency power source). In preparation for loss of these power sources, a battery 13D is connected to the open/close valve 25. In the present embodiment, an expansion valve 28 to which the battery 13B is connected is installed on the liquid pipe 19.

Consider a situation in which the operation of the nuclear power plant 1 is stopped and the normal power source, the outside power source, and the emergency power source are lost. After the operation of the nuclear power plant 1C is stopped, the open/close valve 21 is opened by the electricity from the battery 13C at an early stage similarly to embodiment 1 and the steam in the reactor pressure vessel 2 is discharged into the suppression pool 6 through the steam discharge pipe 20 and is condensed. In addition, simultaneously with opening of the open/close valve 21 (or after the pressure in the reactor pressure vessel 2 drops due to discharge of steam into the suppression pool 6), the injection valve 11 is opened by the electricity from the battery 13A and the cooling water in the water tank 10 is injected into the reactor pressure vessel 2.

When the predetermined time elapses after the stop of the nuclear power plant, the electricity is supplied from the battery 13B to the expansion valve 28, and the expansion valve 28 is opened. Furthermore, the electricity is supplied to the open/close valve 25 from the battery 13D, and the open/close valve 25 is opened. The heat exchanger tubes of the evaporator 15, the steam pipe 18, the heat exchanger tubes of the condenser 16 and the liquid pipe 19 are filled with a cooling medium and similarly to embodiment 1, the cooling medium is evaporated to become steam in the heat exchanger tubes of the evaporator 15. The steam of the cooling medium ascends in the steam pipe 18 and reaches the condenser 23. Meanwhile, the steam in the reactor pressure vessel 2 is supplied to the turbo-motor 24 through the steam pipe 26 and the turbo-motor 24 rotates. The rotation of the turbo-motor 24 is transferred to the compressor 23 and the compressor 23 also rotates. The steam discharged from the steam outlet of the turbo-motor 24 is discharged into the cooling water of the suppression pool 6 through the steam discharge pipe 27 and is condensed. When the pressure in the reactor pressure vessel 2 is high (for example, 1 MPa or higher), the turbo-motor 24 is driven by the steam in the reactor pressure vessel 2 and rotates the compressor 23. When the pressure in the reactor pressure vessel 2 is reduced to, for example, less than 1 MPa, the rotation of the turbo-motor 24 is stopped. At this time, the cooling medium in the reactor cooling apparatus 14 is circulated through the heat exchanger tubes of the evaporator 15, the steam pipe 18, the heat exchanger tubes of the condenser 16, the liquid pipe 19, and the heat exchanger tubes of the evaporator 15 similarly to embodiment 1. The steam of the cooling medium flowing in the steam pipe 18 passes through the compressor 23 and reaches the condenser 16. In this way, the heat of the cooling water in the reactor pressure vessel 2 is transmitted to the air in the inner space 22 and the cooling water in the reactor pressure vessel 2 is cooled.

The steam of the cooling medium reaching into the compressor 23 is compressed by the rotation of the compressor 23 and rises in temperature. The steam of the cooling medium rising in temperature is introduced to the condenser 16, and then the steam is cooled and condensed by the air in the inner space 22 in the condenser 16. The liquid of the cooling medium generated by compression passes through the liquid pipe 19, is expanded by the expansion valve 28, falls in temperature, and is supplied to the evaporator 15. The liquid of the cooling medium becomes steam again in the evaporator 15.

The present embodiment can obtain each effect generated in embodiment 1. Furthermore, in the present embodiment, the compressor 23 can raise the temperature of the steam of the cooling medium, so that the difference between the temperature of the steam of the cooling medium in the condenser 16 and the temperature of the air in the inner space 22, that is, the heat drop, can be increased and the radiant heat transfer effect is increased. As a result, the radiation rate from the steam of the cooling medium to the inner space 22 can be increased. Further, the pressure of the liquid of the cooling medium after passing through the expansion valve 28 can be made smaller, so that the difference between the pressure of the liquid of the cooling medium flowing into the evaporator 15 and the pressure in the reactor pressure vessel 2 is increased, thus the heat transfer property of the evaporator 15 can be improved and the evaporator 15 can be miniaturized.

REFERENCE SIGNS LIST 1, 1A, 1B, 1C: nuclear power plant, 2: reactor pressure vessel, 3: first reactor containment vessel, 4: dry well, 5: pressure suppression chamber, 6: suppression pool, 7: second reactor containment vessel, 8: cooling water pool, 9: water injection apparatus, 10: water tank, 11: injection valve, 12: injection pipe, 13A, 13B, 13C, 13D: battery, 15: evaporator, 16: condenser, 17, 21, 25: open/close valve, 18: steam pipe, 19: liquid pipe, 20, 27: steam discharge pipe, 23: compressor, 24: turbo-motor, 28: expansion valve.

What is claimed is:

1. A nuclear power plant comprising:
   a first reactor containment vessel internally having a dry well and a pressure suppression chamber mutually isolated, said pressure suppression chamber forming a suppression pool being filled with cooling water;
   a reactor pressure vessel disposed in said dry well in said first reactor containment vessel;
   a second reactor containment vessel surrounding said first reactor containment vessel and forming a cooling water pool being filled with cooling water at a bottom, said cooling water pool in said second reactor containment vessel adjoining said suppression pool with said first reactor containment vessel intervening between these pools;
   a steam discharge apparatus; and
   a reactor cooling apparatus,
   wherein said steam discharge apparatus has a steam discharge pipe connected to said reactor pressure vessel and immersed in said cooling water in said suppression pool, and a first open/close valve installed in said steam discharge pipe;
   wherein the reactor cooling apparatus has an evaporator installed in said reactor pressure vessel for evaporating a cooling medium, a condenser disposed in an inner space delimited by said first reactor containment vessel and said second reactor containment vessel above said cooling water pool for condensing steam of said cooling medium generated in said evaporator, a first pipe path connected to said evaporator and said condenser by passing through a side wall of said reactor pressure vessel and a side wall of said first reactor containment vessel, said first pipe path introducing said steam of said cooling medium generated in said evaporator, a second pipe path connected to said condenser and said evaporator by passing through said side wall of said reactor pressure vessel and said side wall of said first reactor containment vessel, said second pipe path introducing a liquid of said cooling medium generated in said condenser to said evaporator, and a second open/close valve installed in either said first pipe path or said second pipe path;
   wherein said evaporator is disposed above a regular water level in said reactor pressure vessel;
   wherein said inner space in which said condenser is disposed is communicated with an air discharge portion attached to a ceiling of said second reactor containment vessel, said air discharge portion being disposed above said evaporator, and said inner space is communicated with an air supply portion attached to a side wall of said second reactor containment vessel above a liquid surface of said cooling water pool and below said condenser, said inner space introducing air for removing decay heat generated in fuel assemblies in a core disposed in said reactor pressure vessel,
   wherein said condenser is a condenser condensing said steam of said cooling medium by said air ascending in said inner space from said air supply portion toward said air discharge portion; and
   wherein said inner space is configured to provide continuous air flow between the cooling water pool and the air discharge portion.

2. The nuclear power plant according to claim 1, wherein said second pipe path is disposed in said cooling water pool and said suppression pool.

3. The nuclear power plant according to claim 2, wherein a compressor is installed in said first pipe path, and a turbo-motor rotating with steam in said reactor pressure vessel being supplied is connected to said compressor, and said second open/close valve installed in said second pipe path is an expansion valve.

4. The nuclear power plant according to claim 3, wherein a third open/close valve is installed on a steam pipe connected to said reactor pressure vessel and said turbo-motor; and a battery is connected to said third open/close valve.

5. The nuclear power plant according to claim 1, wherein a compressor is installed in said first pipe path, and a turbo-motor rotating with steam in said reactor pressure vessel being supplied is connected to said compressor, and said second open/close valve installed in said second pipe path is an expansion valve.

6. The nuclear power plant according to claim 5, wherein a third open/close valve is installed on a steam pipe connected to said reactor pressure vessel and said turbo-motor; and a battery is connected to said third open/close valve.

7. The nuclear power plant according to claim 1,
   wherein said air discharge portion includes an air discharge pipe provided with a third open/close valve, and said air supply portion includes an air supply pipe provided with a fourth open/close valve, and
   wherein a first battery is connected to said third open/close valve and a second battery is connected to said fourth open/close valve.

* * * * *